R. J. GOODNOW.
FRUIT AND NUT SQUEEZER.
APPLICATION FILED MAR. 23, 1911.

1,026,670.

Patented May 21, 1912.

2 SHEETS—SHEET 1.

WITNESSES:
M. E. Flaherty
J. J. Kenneally

INVENTOR:
Russell J. Goodnow
By
Evarts Hayes
his attorneys.

COLUMBIA PLANOGRAPH CO., WASHINGTON, D. C.

R. J. GOODNOW.
FRUIT AND NUT SQUEEZER.
APPLICATION FILED MAR. 23, 1911.

1,026,670.

Patented May 21, 1912.

2 SHEETS—SHEET 2.

WITNESSES:
M. E. Flaherty.
J. J. Kenneally

INVENTOR:
Russell J. Goodnow
By
Conrad Hayes
his attorneys

UNITED STATES PATENT OFFICE.

RUSSELL J. GOODNOW, OF BOSTON, MASSACHUSETTS.

FRUIT AND NUT SQUEEZER.

1,026,670.  Specification of Letters Patent.  Patented May 21, 1912.

Application filed March 23, 1911. Serial No. 616,338.

*To all whom it may concern:*

Be it known that I, RUSSELL J. GOODNOW, of Boston, in the county of Suffolk and State of Massachusetts, a citizen of the United States, have invented a new and useful Improvement in Fruit and Nut Squeezers, of which the following is a specification.

My invention relates to squeezers for squeezing lemons and other fruit, but it may also be used for cracking nuts and the like. It will be understood by reference to the drawings in which its most convenient embodiment is shown.

Figure 1:
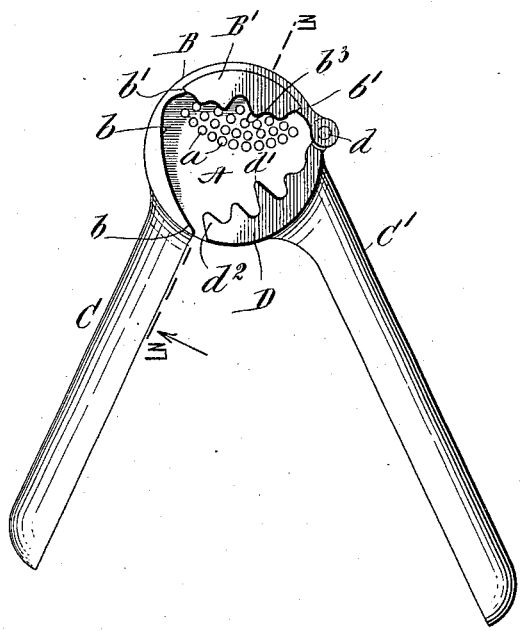
Figure 2:
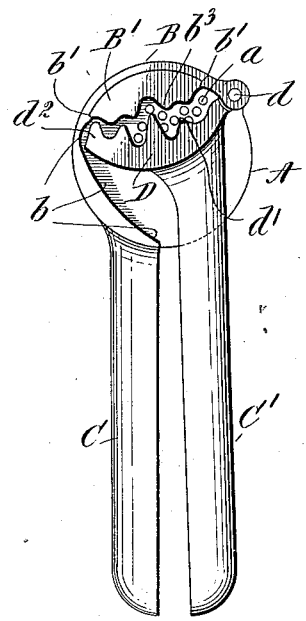
Figure 3:
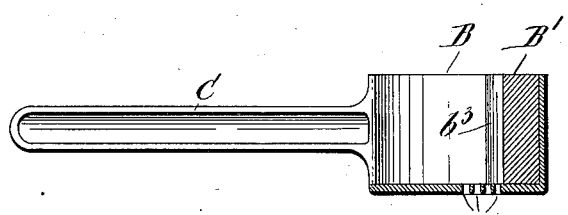
Figure 4:
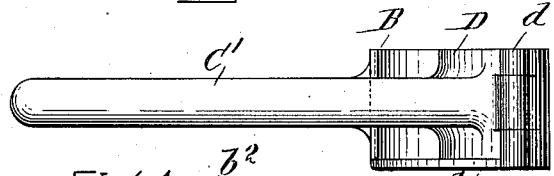
Figure 5:
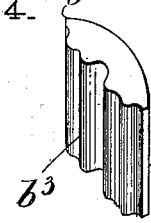
Figure 6:
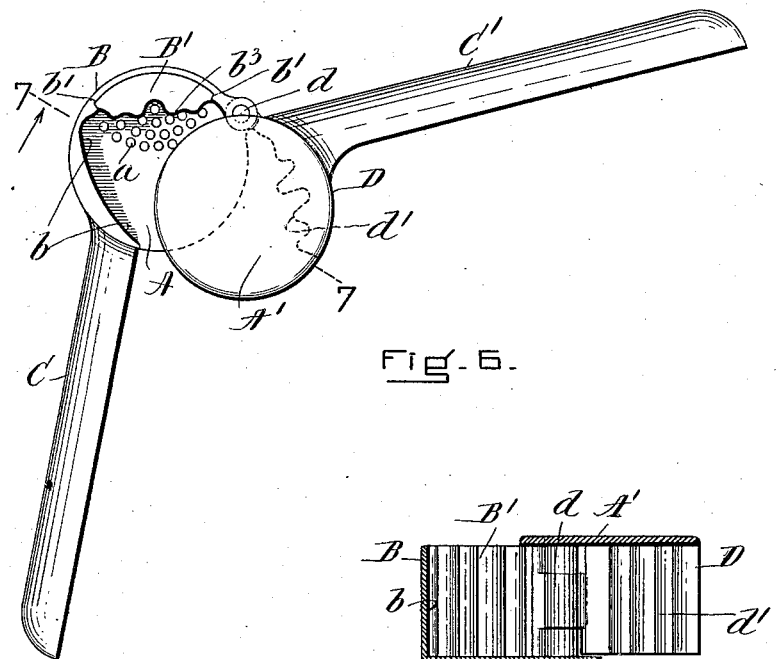

Figure 1 is a plan of a device embodying my invention in open position. Fig. 2 is a plan of the same device closed. Fig. 3 is a section on line 3—3 of Fig. 1. Fig. 4 is a side elevation of the device in closed position. Fig. 5 is a perspective view of the detachable jaw piece. Fig. 6 shows a modification, Fig. 7 being a section on line 7—7 of Fig. 6 omitting the handle.

A is a plate provided preferably with perforations $a$ in a portion of it. From a portion of the edge of this plate projects at right angles thereto a wall B, this wall being of any convenient height, say $1\frac{1}{2}$ inches. To one end of this wall is attached a handle C and to the other end of this wall is pivoted at $d$ a jaw D provided with a handle $C^1$. This jaw is preferably adapted by its curvature, size and height to form a continuation of the wall B and the jaws and their handles are so arranged with relation to each other that the handles can be gripped by one hand to exert pressure on the article in the squeezer.

The jaw D has preferably ribs $d^1$ which engage the article to be squeezed or crushed and force or squeeze or crush it against the opposing wall B. In the case of fruit such as lemons or oranges it is desirable that the end $d^2$ of the jaw D as it closes on the fruit shall maintain a fairly close fit against the wall B in order to prevent the escape of juice. For this reason I prefer to shape so much of the interior of its wall as is passed by the end $d^2$ of the jaw D on an arc of a circle struck from the pivot $d$. This curvature is indicated between the extremities $b$, $b$, and this portion of the wall is also preferably thickened as shown in order that in the crushing process the handle C shall not bend the wall, but the two shall be stiff enough to maintain their original relations to each other.

As above described, the device is very useful as a fruit squeezer, but in order to especially fit it for other purposes, for example, a nut cracker, I have shown means whereby an auxiliary jaw piece $B^2$ can be attached to the wall B in opposition to the jaw D to coöperate therewith. For this purpose I provide the wall B with a dove-tail groove the edges of which are indicated at $b^1$ into which the jaw piece $B^1$ may be slipped. This jaw piece is shaped preferably as shown in Fig. 5 where $b^2$, $b^2$, are the edges which conform in shape with the dovetail edge $b^1$, the face of the jaw piece being provided with ribs $b^3$ corresponding with the ribs $d^1$ on the jaw D.

Figure 7:
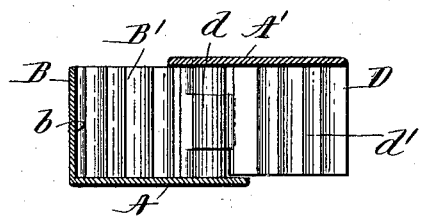

In Figs. 6 and 7 I have shown a device in all respects like that shown in Fig. 1 except that it has a second plate $A^1$ which is attached to the jaw D just as the wall B and plate A are attached together, so that as the handles are brought together the inclosure between the wall and the jaw is covered. This is especially useful where the device is used for cracking nuts as it prevents the particles of nut from flying out.

In practice, if for example a half lemon is to be squeezed, it is placed on the plate A with its open or cut surface in contact therewith, and the handles are then brought together and the lemon squeezed, the juice flowing out through the perforations. In this case, preferably, the jaw piece B is not used as it is unnecessary. As the edge $d^2$ of the jaw D passes close against the portion $b$, $b$, of the wall B there is no tendency of the juice to escape to any extent between the edge $d^2$ and the said portion of the wall. When, however, a nut is to be cracked the jaw piece $B^1$ is preferably used as it serves as a stiffener to the wall B and also, because of its shape, as a gripper to grip the nut.

My invention may be otherwise embodied; the jaw piece may be otherwise shaped and otherwise attached to the wall without departing from the spirit of my invention as defined by the claims.

What I claim as my invention is:—

1. A squeezer comprising a plate having a curved segmental wall arising from the edge thereof and integral therewith, and a similar segmental wall forming a jaw similarly curved and pivotally mounted on said plate and movable with relation thereto, said jaw forming a continuation of said first-named wall, said plate and said jaw each having a handle, the whole forming a collapsible chamber normally approximately circular in shape to receive a fruit and when in closed position forming a receptacle for the waste.

2. A squeezer comprising a plate having a curved segmental wall arising from the edge thereof and integral therewith, and a similar segmental wall forming a jaw similarly curved and pivotally mounted on said plate and movable with relation thereto, said jaw forming a continuation of said first-named wall, said plate and said jaw each having a handle, the whole forming a collapsible chamber normally approximately circular in shape to receive a fruit and when in closed position forming a receptacle for the waste, a portion of the inner surface of said first-named wall being formed on the radius of said jaw whereby the inner edge of said jaw will hug said surface during the squeezing operation.

3. A squeezer comprising a plate having a curved wall extending at right angles from it and a jaw pivoted to one end of said wall, its free end being adapted to be moved over the surface of said plate in substantial contact with the further portion of said wall, and means for moving said jaw with reference to said wall, said wall being provided with means adapted to retain a jaw piece in position to coöperate with said jaw.

4. A squeezer comprising a plate having a curved wall extending at right angles from it and a jaw pivoted to one end of said wall, its free end being adapted to be moved over the surface of said plate in substantial contact with the further portion of said wall, means for moving said jaw with reference to said wall, in combination with a separable jaw piece and means adapted to hold said jaw piece against said wall in position to coöperate with said jaw.

5. A squeezer comprising a perforated plate having mounted on its edge a curved segmental wall thicker at one end than at the other, and a second segmental wall forming a jaw similarly curved and pivotally connected with the said plate to form a hinged continuation of the thin edge of said first-named wall, the thickened portion of said first-named wall being curved on its inner surface whereby the free end of said jaw during the squeezing operation will hug said inner surface, and handles, one attached to said thickened portion of said first-named wall and the other attached to said jaw.

6. A squeezer comprising a perforated plate having mounted on its edge a curved segmental wall thicker at one end than at the other, and a second segmental wall forming a jaw similarly curved and pivotally connected with the said plate to form a hinged continuation of the thin edge of said first-named wall, the thickened portion of said first-named wall being curved on its inner surface whereby the free end of said jaw during the squeezing operation will hug said inner surface, and handles, one attached to said thickened portion of said first-named wall and the other attached to said jaw, said jaw carrying a covering plate as set forth.

RUSSELL J. GOODNOW.

Witnesses:
GEORGE O. G. COALE,
M. E. FLAHERTY.

Copies of this patent may be obtained for five cents each, by addressing the "Commissioner of Patents, Washington, D. C."